Patented Aug. 23, 1932

1,872,914

UNITED STATES PATENT OFFICE

HENRY DREYFUS, OF LONDON, ENGLAND

MANUFACTURE OF ALIPHATIC ACID ANHYDRIDES

No Drawing. Application filed July 19, 1928, Serial No. 294,060, and in Great Britain July 30, 1927.

This invention relates to the manufacture of aliphatic anhydrides from aliphatic acids and especially to the manufacture of acetic anhydride from acetic acid.

It was shown by Peytral (Bulletin de la Société Chimique de France vol. XXXI pages 113–118) that acetic anhydride can be produced by passing glacial acetic acid vapours through platinum tubes heated to about 1100° C. In the process a yield of about 2% of acetic anhydride was obtained, and the quantity of decomposition products formed such as gases, as given by Peytral, was very small or unsubstantial, most of the vapours from the reaction being recovered as acetic acid on condensation, though statements to the contrary have been made in literature.

Later it has been suggested that the formation of acetic anhydride by pyrogenic decomposition of acetic acid can be performed by using certain catalysts, which in particular are such as have no power to produce decomposition products such as acetone, or by avoiding the presence of metals as contact materials or by avoiding very high temperatures, and processes based on these suggestions claim increased yields of acetic anhydride.

I have found that aliphatic anhydrides may be produced by subjecting aliphatic acids to pyrogenic decomposition in presence of "reducible metals" (i. e. metals whose oxides or salts are readily reduced to metal by the action of hydrogen or other reducing gases), but that under continuous working certain difficulties are liable to arise. Thus for instance when performing the reaction in copper tubes or otherwise in presence of copper, the reaction proceeds normally for a time, but in many cases after working for prolonged periods, or often on restarting the reaction after allowing the apparatus to cool down, a large amount of decomposition products, such as carbon, acetone or gases, are formed. Similar results are also obtained with other "reducible metals." The reasons for these disadvantages are not entirely clear but they are possibly due to oxidation of the surface of the metal, which causes more violent reaction and decomposition of the aliphatic acid vapour to gases or other products such as acetone.

I have now found that by passing a stream of hydrogen or other reducing gas through the reaction zone during the heating up thereof and/or during the passage of the aliphatic acid vapour the above difficulties may be largely or entirely overcome.

According to the invention therefore I produce aliphatic anhydrides (and especially acetic anhydride) by passing aliphatic acid (and especially acetic acid) vapour through a reaction zone made of or containing one or more "reducible" metals and heated to high or relatively high temperatures, and pass hydrogen or other reducing gas intermittently or continuously through the reaction zone during the passage of the aliphatic acid vapour and/or prior to the passage of the aliphatic acid vapour. When the reducing gas is passed through the reaction zone prior to the passage of the aliphatic acid vapour (whether or not it is passed during the passage of the aliphatic acid vapour) the reaction zone may be heated to any temperature suitable for the reduction of oxide on the surface of the "reducible" metal; conveniently the reducing gas may be passed during the heating up of the reaction zone or through the hot reaction zone immediately prior to passing the aliphatic acid vapour.

I preferably pass the reducing gas during the passage of the aliphatic acid vapour and also prior to the passage of the aliphatic acid vapour.

In performing the invention I may for example pass a mixture of acetic acid vapour (or other aliphatic acid vapour) and hydrogen or other reducing gas through tubes or other form of apparatus made of one or more "reducible" metals and heated to the desired temperature; or for instance I may pass a mixture of acetic acid (or other aliphatic acid vapour) through tubes or other apparatus coated with one or more reducible metals or containing pumice or other contact substances coated with one or more reducible metals. Preferably I also pass the reducing gas through the apparatus when heating up the apparatus to the reaction temperature or through the hot reaction zone immediately prior to passing the mixture of aliphatic acid vapour and reducing gas. Further I have found it advantageous to pass the reducing gas through the apparatus when cooling down after performing the reaction.

In cases where it is desired to employ the reducible metals coated upon pumice or other contact materials, such coating may conveniently be performed by spraying or impregnating the contact material with a sulphate or other suitable salt of the metal and then reducing the salt in the known manner with hydrogen or the like, and if desired, such reduction may be performed during the heating up of the reaction zone prior to the passage of the aliphatic acid vapour.

For the purposes of the invention I may employ any "reducible" metal or metals such for example as copper, nickel, tin, iron, cobalt, bronze, lead, zinc, cadmium; and metals (such for example as nickel or copper) whose acetates yield acetic acid on heating are especially suitable.

In cases where the apparatus is made of or lined with the reducible metal steps should preferably be taken to ensure, as far as possible, mechanical and chemical cleanliness of the metal surface prior to passing the aliphatic acid vapour, whether or not the reducing gas is passed through the apparatus prior to the passage of the aliphatic acid vapour. For instance when the apparatus is made of or lined with copper, nickel or other reducible metal it is advantageous, prior to heating up the apparatus for performing the process, to wash the interior of the apparatus with dilute acids (e. g. dilute nitric acid) such washing being preferably followed by washing with water and/or passing steam through the apparatus.

The reaction may be performed at temperatures of between about 200° C. and 1200° C. and is especially active when temperatures of from about 700° to 1000° C. are employed; the higher the temperature the higher should be the speed of passage of the aliphatic acid vapour (or mixture of aliphatic acid vapour and reducing gas). I preferably perform the reaction at temperatures of from about 500° to 700° C.

Instead of hydrogen I may employ any other reducing gas such for example as carbon monoxide, mixtures of carbon monoxide and hydrogen, coal gas, producer gas and the like. Preferably carbon monoxide or mixtures containing the same should not be employed in presence of iron or other metals which form volatile carbonyls.

The anhydride produced by the process may be separated from the reaction vapours in any suitable way. In order, however, to avoid hydrolysis and consequent loss of anhydride the vapours are preferably not submitted to simple condensation but are treated to separate the anhydride from the water vapour present or formed in the reaction. For instance the vapours from the reaction may be subjected to fractional condensation for example by leading them up through one or more fractionating columns maintained at a temperature or temperatures intermediate between the boiling points (under the conditions of pressure obtaining) of the anhydride and of water whereby the anhydride is condensed and the water passes on in vapour form.

Or for instance the reaction vapours may be passed through a liquid, being a liquid or liquid mixture insoluble or substantially insoluble in water and of higher boiling point than water (preferably of higher boiling point than the anhydride) and preferably being a solvent for the anhydride, such liquids being preferably employed at temperatures intermediate between the boiling points (under the conditions of pressure obtaining) of water and of the anhydride, whereby the anhydride is condensed or absorbed and the water escapes in vapour form. As examples of such liquids may be mentioned chlorbenzols, benzyl ether, tetrachlorethane, acetylglycerines, anisol, acetylcresol, phenetol, paraffin oil or mixtures of two or more of such bodies.

Or, for instance, the reaction vapours may for instance be subjected to condensation by the process described in British specification No. 303,772 of 7th July, 1927 and in the corresponding U. S. specification S. No. 284,566 filed June 11, 1928 that is to say the anhydride may be condensed from the reaction vapours whilst carrying away the water vapour by the vapour of one or more entraining liquids. In such form of execution the reaction vapours are preferably mixed, after leaving the hot reaction zone, with the vapours of the entraining liquid or liquids at a temperature below the boiling point (under the conditions of pressure obtaining) of the anhydride. Conveniently such mixing may be performed by introducing the reaction vapours (which should not be allowed to cool below the boiling point of water before becoming mixed with the vapours of the entraining liquid or liquids) into a vessel up which the vapours of the entraining liquid or liquids are caused to rise; by this means the anhydride may be substantially condensed and the water vapour carried away with the vapours of the entraining liquid or liquids. Examples of entraining liquids which I may use for such method of condensation are, as indicated in said British specification No. 303,772 and corresponding U. S. specification S. No. 284,566 filed June 11, 1928 benzene, carbon tetrachloride, petrol, mixtures of two or more of such bodies, or mixtures of ether with petroleum ether; it will be understood, however, as explained in the said British specification No. 303,772 and the corresponding U. S. specification S. No. 284,566 filed June 11, 1928 that any other liquids chemically inert to the anhydride and having a high entraining capacity for water may be employed. The liquids should preferably have a low entraining capacity for the anhydride. Instead of the entraining liquids referred to in the said specification No. 303,772 and corresponding U. S. specification S. No. 284,566 filed June 11, 1928 I may employ for such method of condensation entraining liquids whose boiling points are intermediate between that of anhydride and of water, for instance toluene or xylene between that of the anhydride and of water.

Or, for instance, the reaction vapours may be subjected to condensation by the process described in British specification No. 298,667 of 14 July 1927 and in the corresponding U. S. specification S. No. 285,613 filed June 15, 1928 that is to say they may be subjected to condensation by leading them under the surface of an "extracting" liquid cooled down or otherwise kept at temperatures below (and preferably considerably below) the boiling point of water. As explained in the said British specification No. 298,667 and corresponding U. S. specification S. No. 285,613 filed June 15, 1928, by the term "extracting" liquid is meant a liquid or liquid mixture which is chemically inert to the anhydride and insoluble or substantially insoluble in water. As examples of such "extracting" liquids may be mentioned benzene, chloroform and mixtures of ethyl ether or chloroform with one or more hydrocarbons such as light paraffins, gasoline, kerosene, benzol or its homologues. As stated in the said British specification No. 298,667 and corresponding U. S. specification S. No. 298,667 filed June 15, 1928 it is preferable to use as "extracting" liquids, liquids of the character referred to which are themselves hydrocarbons or which contain hydrocarbons, for example benzene or mixtures of ethyl ether or chloroform with one or more hydrocarbons such as paraffins (particularly the petroleum fraction of boiling point 40° to 70° C. termed petroleum ether), gasoline (boiling point 70° to 90°C.), kerosene, benzol or its homologues. The following particular examples of "extracting" liquids are very suitable:—ether in admixture with petroleum ether, chloroform mixed with petroleum ether and/or gasoline; and mixtures of ether and petroleum ether containing about 30 to 50% petroleum ether are especially suitable.

Or, for instance, the reaction vapours may be treated by the process described in my British specification No. 289,972 of 8 February 1928 and in the corresponding U. S. specification S. No. 242,977 filed 27 December 1927, that is to say they may be passed over or otherwise in contact with one or more "water binding" substances maintained at a temperature or temperatures below (and preferably substantially below) the temperatures at which the reaction vapours are produced. By such treatment the water vapour may be substantially absorbed from the reaction vapours. In such treatment the water binding substances are preferably maintained at temperatures above the boiling point (under the conditions of pressure obtaining) of water to avoid condensation of water and the resulting risk of loss of anhydride through hydrolysis, and for the best functioning of the treatment the water binding substances should be employed at temperatures above the boiling point of the anhydride in which case the water can be substantially absorbed and the anhydride pass on in vapour form. As explained in my said British specification No. 289,972 and corresponding U. S. specification S. No. 242,977 filed 27 December 1927 the term "water binding" substance means bisulphates, pyrosulphates (especially bisulphates and pyrosulphates of the alkali and earth alkali metals), zinc chloride, calcium chloride, orthophosphoric acid, pyrophosphoric acid, metaphosphoric acid and like substances which have affinity (and preferably high affinity) for water but excluding substances having a deleterious effect on aliphatic acids or anhydrides, such as sulphuric acid.

It will be understood that the invention is not limited as to the strength of the aliphatic acid employed. The process can be performed even with the vapours of dilute acids; and besides affording a ready means for the manufacture of acetic (or other aliphatic) anhydride from concentrated or highly concentrated or "glacial" acids, it affords useful means for producing anhydrides from waste or dilute acids, especially waste or dilute acetic acids such as result from the acetylation of cellulose or other industrial acetylation processes.

The following example serves to illustrate one form of execution of the invention, it being understood that this is given only by way of illustration and is in no way limitative.

A copper tube or other form of copper reaction zone is heated to the temperature at which it is desired to perform the decomposition of the aliphatic acid vapour, e. g. 500 to 700° C., and during the heating up of the tube or the like a rapid stream of hydrogen is passed through the same. When the reaction zone has attained the desired temperature a mixture of hydrogen and acetic acid vapour (for instance a mixture containing 1 to 2 molecules of hydrogen relatively to one molecule of acetic acid) is passed in a rapid stream through the apparatus. The gases or vapours leaving the reaction zone are subjected to fractional condensation by leading them upwards through one or more fractionating columns maintained at temperatures intermediate between the boiling points of acetic anhydride and of water.

On initially starting up the apparatus or on restarting the same after a period of disuse it is preferable, before heating up, to clean the interior of the reaction zone in the following manner. A stream of dilute nitric acid is first run through the reaction zone, this stream being followed by a stream of water. After passing the stream of water until the majority of the nitric acid is removed, steam is blown through the reaction zone until substantially all nitric acid is removed from the apparatus, whereupon the reaction zone is heated up to the desired reaction temperature in the manner above described.

What I claim and desire to secure by Letters Patent is:—

1. In a process of manufacturing an aliphatic anhydride by subjecting the vapor of a volatile aliphatic acid to pyrogenic decomposition, and wherein the aliphatic acid vapor is passed through the heated reaction zone containing at least one metal whose oxide is reducible by a reducing gas, the step of passing at least one reducing gas through the reaction zone, during at least one of the following two stages of the process, (a) the heating up of the reaction zone, (b) the passage of the aliphatic acid vapor through the heated reaction zone.

2. In a process of manufacturing acetic anhydride by subjecting acetic acid vapor to pyrogenic decomposition, and wherein the acetic acid vapor is passed through the heated reaction zone, containing at least one metal whose oxide is reducible by a reducing gas, the step of passing at least one reducing gas through the reaction zone during at least one of the following two stages of the process, (a) the heating up of the reaction zone, (b) the passage of the acetic acid vapor through the heated reaction zone.

3. In a process of manufacturing an aliphatic anhydride by subjecting the vapor of a volatile aliphatic acid to pyrogenic decomposition and wherein the aliphatic acid vapor is passed through the heated reaction zone containing at least one metal whose oxide is reducible by hydrogen, the step of passing hydrogen through the reaction zone during at least one of the following two stages of the process, (a) the heating up of the reaction zone, (b) the passage of the aliphatic acid vapor through the heated reaction zone.

4. In a process of manufacturing acetic anhydride by subjecting acetic acid vapor to pyrogenic decomposition and wherein the acetic acid vapor is passed through the heated reaction zone, containing at least one metal whose oxide is reducible by hydrogen, the step of passing hydrogen through the reaction zone during at least one of the following two stages of the process, (a) the heating up of the reaction zone, (b) the passage of the acetic acid vapor through the heated reaction zone.

5. In a process of manufacturing an aliphatic anhydride which comprises passing the vapor of a volatile aliphatic acid through the heated reaction zone containing at least one metal whose oxide is reducible by a reducing gas, the steps of heating the reaction zone up to the reaction temperature and, concurrently therewith, passing a stream of at least one reducing gas continuously through said reaction zone, and thereafter passing a mixture of at least one reducing gas and the vapor of an aliphatic acid through the heated reaction zone.

6. In a process of manufacturing acetic anhydride which comprises passing acetic acid vapor through the heated reaction zone containing at least one metal whose oxide is reducible by a reducing gas, the steps of heating the reaction zone up to the reaction temperature and, concurrently therewith, passing a stream of at least one reducing gas continuously through said reaction zone, and thereafter passing a mixture of at least one reducing gas and acetic acid vapor through the reaction zone.

7. In a process of manufacturing an aliphatic anhydride which comprises passing the vapors of a volatile aliphatic acid through the heated reaction zone containing at least one metal whose oxide is reducible by hydrogen, the steps of heating the reaction zone up to the reaction temperature and, concurrently therewith, passing a stream of hydrogen continuously through said reaction zone, and thereafter passing a mixture of hydrogen and the vapor of an aliphatic acid through the reaction zone.

8. In a process of manufacturing acetic anhydride which comprises the passing of acetic acid vapor through the heated reaction zone containing at least one metal whose oxide is reducible by hydrogen, the steps of heating the reaction zone up to the reaction temperature and, concurrently therewith, passing a stream of hydrogen through said reaction zone, and thereafter passing a mixture of hydrogen and acetic acid vapor through the reaction zone.

9. In a process of manufacturing an aliphatic anhydride which comprises passing the vapor of a volatile aliphatic acid through the reaction zone comprising copper, the steps of heating the reaction zone up to the reaction temperature and, concurrently therewith, passing a stream of at least one reducible gas continuously through said reaction zone, and thereafter passing a mixture of at least one reducing gas and the vapor of an aliphatic acid through the heated reaction zone.

10. In a process of manufacturing acetic anhydride which comprises acetic acid vapor through the heated reaction zone comprising copper, the steps of heating the reaction zone up to the reaction temperature and, concurrently therewith, passing a stream of at least one reducing gas continuously through said reaction zone, and thereafter passing a mixture of at least one reducing gas and acetic acid vapor through the heated reaction zone.

11. In a process of manufacturing an aliphatic anhydride which comprises passing the vapor of a volatile aliphatic acid through the heated reaction zone comprising copper, the steps of heating the reaction zone up to the reaction temperature and, concurrently therewith, passing a stream of hydrogen continuously through said reaction zone, and thereafter passing a mixture of hydrogen and the vapor of an aliphatic acid through the heated reaction zone.

12. In a process of manufacturing acetic anhydride which comprises passing the acetic acid vapor through the heated reaction zone comprising copper, the steps of heating the reaction zone up to the reaction temperature and, concurrently therewith, passing a stream of hydrogen through said reaction zone, and thereafter passing a mixture of hydrogen and acetic acid vapor through the heated reaction zone.

In testimony whereof I have hereunto subscribed my name.

HENRY DREYFUS.